No. 727,031. PATENTED MAY 5, 1903.
F. TREMAIN.
ELECTRIC CONDUCTOR OR CABLE.
APPLICATION FILED APR. 24, 1902.
NO MODEL.

WITNESSES

INVENTOR
Francis Tremain.
by Herbert W. T. Jenner.
Attorney

No. 727,031. Patented May 5, 1903.

UNITED STATES PATENT OFFICE.

FRANCIS TREMAIN, OF HIGHGATE, ENGLAND.

ELECTRIC CONDUCTOR OR CABLE.

SPECIFICATION forming part of Letters Patent No. 727,031, dated May 5, 1903.

Application filed April 24, 1902. Serial No. 104,558. (No model.)

*To all whom it may concern:*

Be it known that I, FRANCIS TREMAIN, a subject of the King of Great Britain and Ireland, residing at 57 Cromwell avenue, Highgate, in the county of Middlesex, England, have invented new and useful Improvements in or Relating to Electric Conductors or Cables, of which the following is a specification.

This invention consists in improvements in induction-coils for neutralizing the effects of capacity in electric cables or conductors as recommended by many authorities during the past ten years or more. Hitherto no practical form of induction-coil has been designed which, for instance, can be placed within the sheathing of a submarine cable.

The object of my present invention is to devise a coil which shall be small in bulk and secure from injury—for example, during the paying out of a cable from the ship or coiling a cable on drums for transport. It must also be so designed as not to weaken the core of the cable or be liable to damage during the processes of manufacture.

In my invention the coils are wound in multiple disk or sectional form, each disk or section being, for example, three-sixteenths of an inch thick and seven-sixteenths of an inch in diameter. The arbor on which these coils are wound is one-sixteenth of an inch thick. Each coil after winding is treated with hot paraffin or similar insulating material, so that it retains its form when removed from the arbor on which it has been mounted. In another case where a higher inductance was required associated with a low ohmic resistance I made the coils longer and thicker, but wound them on an arbor of approximately the same thickness as that quoted above. In this case each coil is wound in sections or as two windings, the inner and outer windings being, respectively, right-handed and left-handed helices, having a length of four and one-half inches and a thickness of three-fourths of an inch. Six of these coils were associated together to form one multiple coil, which would introduce into the circuit formed by a pair of conductors an inductance of about ten millihenries.

Figure 2:
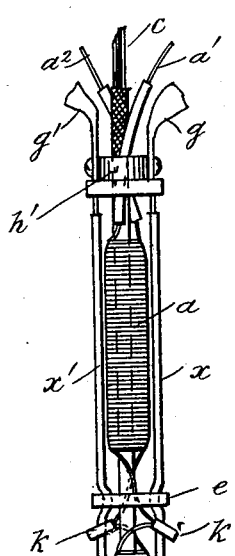
Figure 1:
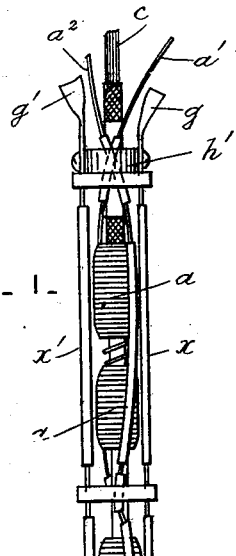
Figure 4:
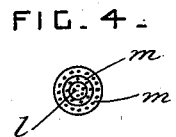
Figure 5:
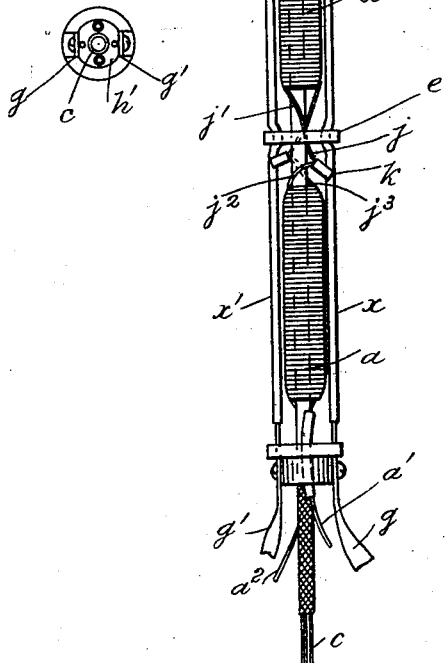
Figure 3:
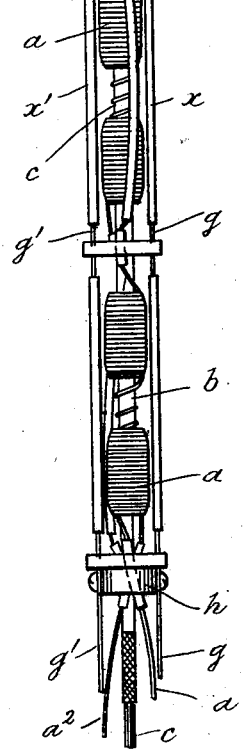
Figure 3:

Figures 1 and 2 of the accompanying drawings show two alternative forms of my improved multiple inductance-coil. Figs. 3 and 4 show the form of composite conductor hereinafter described. Fig. 5 is an end view of Fig. 1, also of Fig. 2.

Referring to Fig. 1, in this example four of the coils $a$ are formed of a single length of wire and as a single winding, and each coil has conical or tapering ends $b$. The coils $a$ are strung upon a central core $c$ of fine iron wires when it is desired to obtain the enhanced inductance due to the presence of iron. $a'$ $a^2$ are the ends of the wires forming the coils which are connected to the cable conductors. When the enhanced inductance above referred to is not necessary, the central core $c$ may be of brass wire or other material having the necessary strength and flexibility. Between the coils or pairs of coils $a$ I fit disks or coil-cheeks $e$ (of wood, brass, or other suitable material) and in some cases distance-pieces $f$, formed of small rubber or other tubes strung on the central core and threaded through the disks or coil-cheeks $e$, so as to keep the coils a predetermined distance apart. The disks or coil-cheeks $e$ also act as retainers or guides for two or more strips or wires $g$ $g'$, which are pressed into slots or threaded through holes in said disks and are connected near their ends to metal or other rings or disks $h$ $h'$. The strips or wires $g$ $g'$ preferably consist of strands or fine wires, which can be left circular throughout the length of the multiple inductance-coil and can take a ribbon form at the ends, where it is necessary to connect them mechanically to cable-conductors of segmental form, such as those specified in my prior United States Patent, No. 682,893, dated September 17, 1901. Suitable covering material is provided on the wires or strips $g$ $g'$, as indicated by $x$ $x'$, which in this case are intended to represent rubber tubing. The core $c$ of the multiple inductance-coil is insulated from but securely spliced to the cable-core at each end, thus serving the purpose of maintaining the mechanical strength of the core.

The wires or strips $g$ $g'$ are more particularly intended for use in the case of pair-wire, four-wire, or other multiple cables. These strips or wires $g$ $g'$, having been secured to the conductors and to the metal or other coil-cheeks or disks $h$ $h'$, prevent any strain being thrown upon the connections of the multiple induction-coil above described, which is secure from injury in the recess or cage thus formed.

In the arrangement shown in Fig. 2, which is designed for use where a higher inductance is required associated with a low ohmic resistance, the coils $a$ are made longer and thicker than those shown in Fig. 1, but are wound on an arbor of approximately the same thickness as that hereinbefore mentioned. In this case the coils are wound in sections as inner and outer windings, said windings being, respectively, right-handed and left-handed helices, as hereinbefore mentioned. In this case, Fig. 2, the short tubular distance-pieces (marked $f$ in Fig. 1) are omitted. In this figure $j\ j'\ j^2\ j^3$ are the ends of the wires of adjacent coils (which are made separate instead of from a single length of wire, as in Fig. 1) twisted together to form an electrical connection, these ends being covered by small tubes of rubber or other insulating covering, (marked $k$.)

Each of the coils $a$ may be wound with one, two, or more wires, and they may be joined together in series or parallel with each other and in series with the cable conductors with perfect safety.

Around the recess or housing for the coils or multiple induction-coil formed by the disks or rings $e\ h\ h'$ and wires or strips $g\ g'$ a tape of any suitable material may be wound for an outer protection, or a rubber or other tube may be passed over the coils, and in this tube the strips or wires $g\ g'$ may be embedded. As an alternative the coils or the multiple induction-coil may be passed through a wire-covering machine and the coils embedded in gutta-percha, rubber, or other similar material, so as to fill all the interstices with a protecting material which is at the same time flexible.

The coils or disk coils $a$, Fig. 1, may be wound in spherical sections instead of as shown, and the winding may in this case also be continued from section to section with little or no space between said sections.

I sometimes interpose between each of the spherical or conical sections a small washer to prevent friction between the sections when the multiple coil is bent into semicircular shape during manufacture. Over the multiple inductance-coil so formed protection is provided, as already described, which, with the disks and wires already mentioned for maintaining the metallic and mechanical strength, preserves it from mechanical injury.

Although many recommend the use of induction-coils to neutralize the effects of capacity, it is clear that this can only be a crude approximation of the best results possible, the detrimental factor (the electrostatic capacity) being distributed throughout the entire line at infinitely small recurring periods. In order to approach this condition with the counterbalancing factor, it is necessary that it should also be distributed throughout the line, and wherever this is possible I attain this object by making the conductor of a composite character, as shown in Fig. 3, the center or core $l$ being formed of fine iron wires and the exterior of one or more insulated conductors $m$ of greater conductivity, which are caused to revolve around a central core $l$ in stranding, as shown, thus producing a longitudinal magnetic field. In the case of circuits of low electrostatic capacity the central core $l$ may be of copper instead of iron, and in both cases the whole of the conductors may be bunched together, so as to provide the necessary conductivity. I also make this composite conductor by stranding the insulated conductors $m$ around a central core of hemp, yarn, jute, or other suitable non-conducting material in order to avoid the shunt effect of the central core, thus causing the whole of the current to revolve and produce a magnetic field.

I wish it to be distinctly understood that I am aware that it has previously been proposed to use induction-coils in electric cables.

What I claim as my invention, and desire to secure by Letters Patent, is—

1. In an electric cable, a multiple induction-coil consisting of coils formed of one or more lengths of wire said coils being threaded on a core wire or wires on which core-disks are also threaded between the coils, and longitudinal wires or strips attached to or threaded through said disks and fastened at a distance from their ends to end rings or disks thus forming a flexible cage or housing in which the coils are inclosed, substantially as described for the purposes set forth.

2. A multiple induction-coil consisting of a series of coils formed of one or more lengths of wire said coils being threaded on a core wire or wires on which core-disks are also threaded between the coils, and longitudinal wires or strips threaded through or engaging said disks and fastened at a distance from their ends to end rings or disks thus forming a flexible induction-coil, substantially as and for the purpose specified.

3. The combination, with a central core, of a series of coils arranged on the said core, a series of disks or distance-pieces interposed between certain of the said coils, and flexible longitudinal strips engaging with the said disks outside the said coils, substantially as set forth.

In testimony whereof I have signed my name to this specification in the presence of two subscribing witnesses.

FRANCIS TREMAIN.

Witnesses:
 FRED STORKEY,
 S. J. WATSON.